United States Patent
Alfano et al.

(10) Patent No.: US 7,245,805 B2
(45) Date of Patent: Jul. 17, 2007

(54) METHOD AND APPARATUS FOR PRODUCING A MULTIPLE OPTICAL CHANNEL SOURCE FROM A SUPERCONTINUUM GENERATOR FOR WDM COMMUNICATION

(75) Inventors: Robert R. Alfano, Bronx, NY (US); Iosif Zeylikovich, Brooklyn, NY (US)

(73) Assignee: The Research Foundation of the City University of New York, New York, NY (US)

( * ) Notice: Subject to any disclaimer, the term of this patent is extended or adjusted under 35 U.S.C. 154(b) by 0 days.

(21) Appl. No.: 11/087,213

(22) Filed: Mar. 23, 2005

(65) Prior Publication Data

US 2005/0226577 A1    Oct. 13, 2005

Related U.S. Application Data

(60) Provisional application No. 60/555,312, filed on Mar. 23, 2004.

(51) Int. Cl.
*G02B 6/00* (2006.01)
*H01S 3/10* (2006.01)

(52) U.S. Cl. .......................... 385/122; 372/21
(58) Field of Classification Search ............. 385/122
See application file for complete search history.

(56) References Cited

U.S. PATENT DOCUMENTS

| | | | |
|---|---|---|---|
| 3,782,828 A | 1/1974 | Alfano et al. ............... 356/318 |
| 5,150,248 A * | 9/1992 | Alfano et al. ............... 398/147 |
| 5,517,022 A * | 5/1996 | Bock et al. ............... 250/227.17 |
| 6,987,607 B2 * | 1/2006 | Watanabe ................... 359/332 |

OTHER PUBLICATIONS

Alfano and Shapiro, "Emission in the Region 4000 to 7000 Å VIA Four-Photon Coupling in Glass", Phys. Rev. Lett. 24, pp. 584-587 (1970).
Alfano and Shapiro, "Observation of Self-Phase Modulation and Small-Scale Filaments in Crystals and Glasses", Phys. Rev. Lett. 24, pp. 592-594 (1970).
Alfano and Shapiro, "Direct Distortion of Electronic Clouds of Rare-Gas Atoms in Intense Electric Fields", Phys. Rev. Lett. 24, pp. 1217-1219 (1970).
Takara, "Multiple Optical Carrier Generation from a Super Continuum Source", Optics & Photonics News, pp. 48-51 (Mar. 2002).

* cited by examiner

*Primary Examiner*—Michelle Connelly-Cushwa
*Assistant Examiner*—Chris H. Chu
(74) *Attorney, Agent, or Firm*—The Farrell Law Firm

(57) ABSTRACT

A system and method for producing a multiple optical channel source (MOCS). The method includes producing the SC in a medium using at least one femto-second or pico-second optical input pump pulse; splitting input pump pulse or resultant output SC pulse(s) into a plurality of collinear pulses; applying a time delay $\tau$ between the least one of input pump pulse or SC pulses; and producing a MOCS by the spectral interference of the plurality of SC pulses. The system includes a laser producing femto-second or pico-second pump pulses, a medium with a high value of the $\chi^{(3)}$ nonlinear response to produce spectrally coherent SC, an optical system for delivery of laser pump pulses into the SC producing medium, an optical system for splitting the input pump pulses or output SC pulses into a plurality of collinear pulses, and a means for applying a time delay $\tau$ between the plurality of pump or SC pulses.

15 Claims, 7 Drawing Sheets

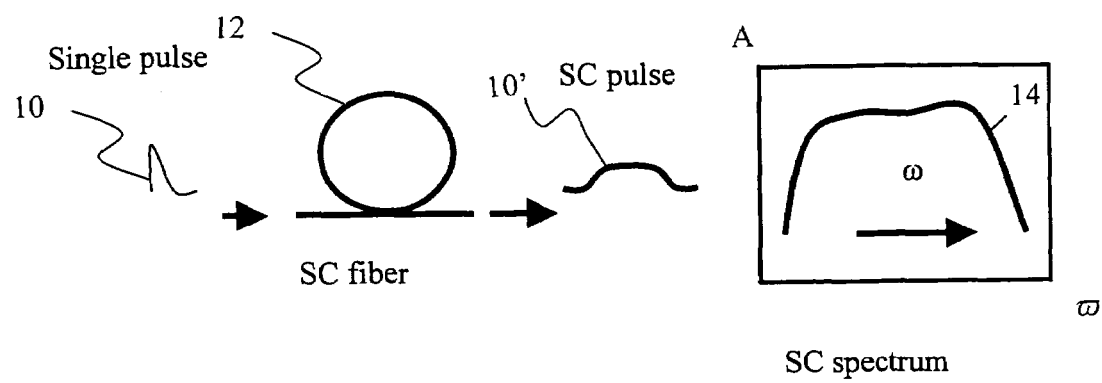
FIG. 1A
(PRIOR ART)
FIG. 1B
(PRIOR ART)
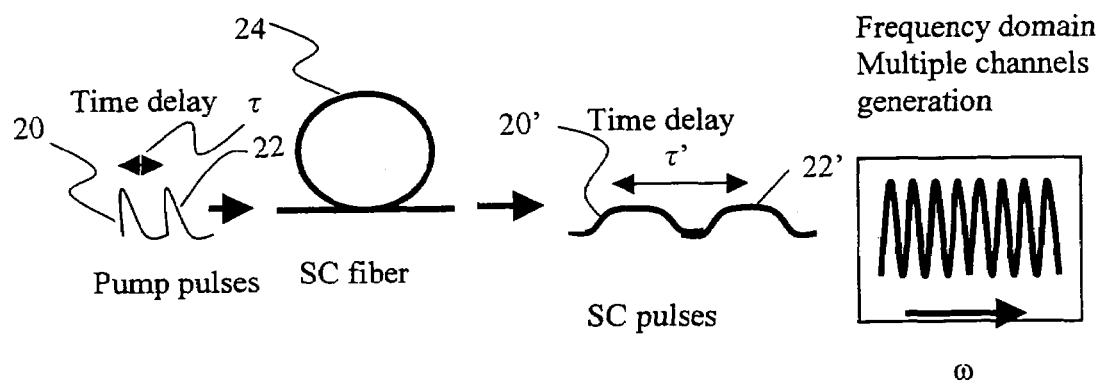
FIG. 2A
FIG. 2B

Basic configuration of the SC source

Basic configuration of the SC multiple channel source (a)

Basic configuration of the SC multiple channel source (b)

METHOD AND APPARATUS FOR PRODUCING A MULTIPLE OPTICAL CHANNEL SOURCE FROM A SUPERCONTINUUM GENERATOR FOR WDM COMMUNICATION

PRIORITY

The present application claims priority to a U.S. Provisional Patent Application entitled "Method And Apparatus For Producing Multiple Optical Channel Source From A Supercontinuum Generation For WDM Communication," filed on Mar. 23, 2004, and assigned Ser. No. 60/555,312, the contents of which are hereby incorporated by reference.

BACKGROUND OF THE INVENTION

1. Field of the Invention

The present invention relates generally to a supercontinuum generator for producing a multiple optical channel source, and more particularly, to a supercontinuum (SC) generator to provide a multiple optical channel source for a wave division multiplexing (WDM) communication system.

2. Description of the Related Art

SC generation refers to the generation of intense ultra-fast broadband "white light" pulses spanning from the ultraviolet (UV) to the near-infrared (near-IR) wavelength regions. SC generation is one of the key requirements necessary for developing ultra-fast laser and nonlinear optics technologies. One method of generating an SC includes inputting a high-power light pulse into a non-linear optical medium wherein the light pulse undergoes a broadening and emerges as an SC. This broadening is due to non-linear interactions between the light and the medium.

When applied to communication systems, SC wavelength-sliced sources have many advantages, chief of which are being background-noise free and having a high-bit rate capacity. Additionally, SC derived sources can reduce the hardware complexity of optical communication systems by replacing many light sources with a single SC source, which would result in commensurate savings in hardware design and testing, and reduce system maintenance and cost.

For example, in conventional wave division multiplexing (WDM) communication systems, a large number of optical sources such as laser diodes are used as a multiple channel source. Additionally, each laser diode must be independently controlled by a controller. This increases the complexity and cost of the WDM communication system and decreases the system's reliability. Moreover, it is difficult to construct existing WDM sources having more than 50 channels. Additionally, it is difficult to provide uniform channel spacing using the existing WDM sources.

SC's based on self phase modulation (SPM) and cross phase modulation (XPM) in bulk fiber mediums were discovered and pioneered by Dr. R. R. Alfano.

SC generation can be used to obtain multiple wavelength channels, as it can easily produce more than 100 optical longitudinal modes, while maintaining the coherency between the frequency modes. An advantage of using longitudinal (frequency) modes of the SC spectrum is that the resultant fixed channel spacing has the accuracy of a microwave oscillator. This means that entire wavelength channels can be fixed to grid frequencies by adjusting just one wavelength.

Other applications for SC-based sources and systems include WDM/TDM optical communication systems and other types of communications systems, optical frequency comb generators, high-resolution spectroscopy, optical metrology and optical tomography.

The SC arises from the propagation of intense picosecond (ps) or femto-second (fs) pulses through condensed matter, fibers, waveguides, or gaseous media (see, R. R. Alfano and S. L. Shapiro: Phys. Rev. Lett. 24, 584, (1970); Phys. Rev. Lett. 24, 592–594, (1970); Phys. Rev. Lett. 24, 1219, (1970) and U.S. Pat. No. 3,782,828, entitled "Picosecond Spectrometer Using Picosecond Continuum," to Alfano et al.). Various processes are responsible for the generation of SC's, including self-, induced-, and cross-phase modulations and four-photon parametric processes, and soliton generation. When an intense laser pulse propagates through a medium, it changes the refractive index of the medium, which, in turn, changes the phase, amplitude, and frequency of the pulse. However, when two laser pulses having different wavelengths propagate simultaneously through a condensed medium, coupled interactions (i.e., cross-phase modulation) occur through the nonlinear susceptibility coefficients. These coupled interactions of two different wavelengths, can introduce phase modulation, amplitude modulation, and spectral broadening in each of the pulses due to the other pulse using cross-effects (see, U.S. Pat. No. 5,150,248, entitled "Terahertz Repetition Rate Optical Computing Systems, And Communication Systems And Logic Elements Using Cross-Phase Modulation Based Optical Processors," to Alfano et al.). Dispersion plays a critical role in the SC, and in particular, about the zero group velocity dispersion region.

Currently, existing optical multiplexing systems such as wavelength/time division multiplexing (WDM/TDM) have limitations which are caused by the number of optical channels which can be provided by an optical channel source. Moreover, many optical channel generators require an individual laser for each optical channel which increases the complexity of the optical channel generator. Therefore, it is difficult to construct a WDM optical channel source that can provide more than 100 optical communication channels. For this reason, SC optical channel sources are a desirable means for providing multiple optical carriers (see, H. Takara. Optics & Photonics news, p. 48–51, March 2002). The advantages of using an SC source include its super-broadband spectrum to simultaneously generate more than 100 channels with fixed spectral channel spacing.

As a result of space-time self-focusing, multi-photon absorption and self-steeping, an "optical shock" wave forms inside the medium that gives rise to an even broader blue-shifted pedestal in the transmitted pulse spectrum.

There are several important applications of the SC pulse, such as a white-light probe pulse to study the fundamental temporal dynamics of elementary excitations in the fields of chemistry, biology and condensed matter. Additionally SC pulses can be used as a multi-wavelength optical source for optical fiber communication systems, and as an optical source for optical coherence tomography (OCT) to detect cells.

Shaping, signal processing, and time-space conversion of fs pulses can be achieved by linear and nonlinear manipulation of the spatially dispersed optical frequency spectrum within a grating pair and lens pulse shaper. This approach can be used for processing of information in ultra high-speed optical communications networks.

An ultrafast coherence cross-correlation technique can be used for the detection of coherence data streams as well as photon echo signals on an fs time scale.

Throughout this document, the term SC fiber is used to refer to SC fibers or other suitable SC producing mediums.

The high degree of spatial coherence of an SC source is highly desirable for use in wireless communication systems and for a frequency comb generation.

SUMMARY OF THE INVENTION

It is, therefore, an object of the present invention to provide an improved SC optical channel source for producing between 200 and 1000 optical channels using a phase stabilized pump laser having a wavelength of 1550 nm, 850 nm or 1300 nm.

It is a further object of the present invention to provide an SC optical channel source having a fixed channel spacing with the accuracy of a microwave oscillator.

Moreover, it is a further object of the present invention to provide an SC optical channel source wherein entire wavelength channels can be fixed to grid frequencies by adjusting a single wavelength.

It is another object of the present invention to provide an SC optical channel source that can be used in WDM optical communication systems, optical frequency comb generators, high-resolution spectroscopy systems, optical metrology systems and optical tomography systems.

In the present invention a method for producing multiple optical frequency channels from an SC generator includes the steps of producing an SC in a medium using at least one femento-second (fs) or at least one pico-second (ps) optical pump pulse, splitting either the optical pump pulse (before it is converted into an SC pulse) or an output SC pulse (after the optical pump pulse has been converted into an SC pulse) into the at least two collinear pulses, applying a time delay between the at least two pump pulses or SC pulses (dependent upon which type of pulse has been split as described above), and producing a plurality of optical frequency channels through spectral interference of the at least two SC pulses.

A method according to an embodiment of the present invention includes the steps of applying at least a single optical pump pulse to an SC medium so as to generate an SC pulse output, splitting the output SC pulse into at least two SC pulses, and collinearly combining SC pulses with a desired time delay so as to produce a plurality of optical frequency channels.

Suitable mediums for producing an SC include fibers and waveguides or bulk materials with third order susceptibility ($\chi^{(3)}$)—(nonlinear susceptibility) nonlinear material characteristics.

Moreover, in some embodiments of the present invention, the SC medium can include an SC-producing fiber having a zero-dispersion wavelength $\lambda_D$ where $$\partial(v_g^{-1})/\partial\omega=0 \text{ at } \lambda_D$$

$v_g$ is group velocity, $\omega$ is angular frequency, and the pump laser can include a variable output wavelength having a zero-dispersion wavelength, and a pump wavelength difference that is less than 100 nm. Furthermore, the SC-producing fiber can optionally have a variable length. Suitable mediums for producing the SC include fibers, waveguides or other bulk materials having non-linear material characteristics. For example, such materials can include photonic crystal fibers, highly nonlinear fibers, hollow fibers, crystals, glasses, gases. In yet other embodiments of the present invention, an output of the SC-producing fiber can be coupled to a variable-length polarization-maintaining (PM) fiber.

In still other embodiments of the present invention, an input or an output of the SC-producing fiber is coupled to an interferometer having a variable path difference.

In yet further embodiments of the present invention, an output of the SC-producing fiber can be coupled to an interferometer having a variable path difference and the interferometer's output can be coupled to an imaging spectrograph or an optical spectrum analyzer.

In other embodiments of the present invention, a method for producing multiple optical channels from an SC generator includes the step of adjusting a variable frequency distance between optical channels, by varying the optical time delay between the at least two optical pump or SC pulses.

In still further embodiments of the present invention, a method for producing two collinear pump pulses includes the step of placing a variable thickness glass plate into the path of the optical pump pulse such that at least part of the pump pulse is incident upon the variable thickness glass plate. The variable thickness glass plate is placed such that a part of the optical sources' pump pulse passes through the variable thickness glass plate.

In additional embodiments of the present invention, a method for producing at least two collinear pump pulses includes the steps of beam-splitting and delaying the optical pump pulse into at least two pulses having a desired time delay, and collinearly combining the beam-split pulses with a predetermined optical delay.

In yet other embodiments of the present invention, suitable methods for producing multiple collinear pump pulses include transmitting the original pump pulse through a Fabry-Perot etalon.

Moreover, in one embodiment of the present invention, an apparatus for producing a multiple-optical-channels source from an SC generator includes a laser for producing at least one fs or ps optical pump pulse, a medium having a $\chi^{(3)}$ nonlinear response for producing a spectrally coherent SC pulse, an optical guide for delivering at least one optical pulse into the SC producing medium, an optical splitter for splitting the at least one optical pump pulse or SC pulse into at least two collinear pulses, and a time delay system for applying a delay between the at least two optical pump or SC pulses.

In other embodiments of the present invention, an optical pump source with a variable wavelength may also be used.

In other preferred embodiments of the present invention, an interferometer with a variable path difference is coupled to either or both an input and an output of an SC-producing fiber. Suitable interferometers include those with a variable path difference, such as a fiber-optic-based interferometer with a path difference produced by a piezo-electric transducer. In yet other preferred embodiments of the present invention, a multiple optical channel source is coupled with an optical communication system for increasing the data transmission rates and bandwidth capacity of the communication system. This embodiment can be used with both new and/or existing optical-fiber transmission systems.

A means for producing at least two collinear pump pulses can include a beam-splitter for splitting a pump pulse into the at least two pulses, and a combiner (e.g., a collinear combiner) for collinearly combining the at least two pulses having a desired optical delay.

BRIEF DESCRIPTION OF THE DRAWINGS

The above and other objects, features, and advantages of the present invention will become more apparent from the following detailed description when taken in conjunction with the accompanying drawings in which:

FIG. 1A is an illustration which shows the spectral broadening of an fs pulse within a non-linear fiber medium resulting in an SC pulse output;

FIG. 1B is a graph which illustrates the spectral broadening of the narrow frequency pulse after it has passed through the SC fiber;

FIG. 2A is an illustration which shows the use of two time-delayed pump pulses to produce two spectrally-broadened SC pulses in an SC fiber;

FIG. 2B is a graph which illustrates the frequency domain of a multiple channel generation of the SC pulses shown in FIG. 2A;

DETAILED DESCRIPTION OF THE PREFERRED EMBODIMENT

The present invention provides a novel and useful method for the generation of multiple optical channels which can be used in communication systems and other systems as desired.

An illustration which shows the conventional spectral broadening of an fs pulse within a non-linear fiber medium resulting in an SC pulse output is shown in FIG. 1A. An optical pulse 10 enters an SC fiber medium 12 and undergoes spectral broadening and is converted into an SC pulse 10'.

A graph illustrating the spectral broadening of the narrow frequency pulse after it has passed through the SC fiber is seen in FIG. 1B. Comparison of the SC pulse 10' with the initial optical pulse 10 illustrates the broad flattening of the spectrum of the initial pulse 10 as it is converted into the SC pulse 10'.

An illustration which shows the use of two time-delayed pump pulses to produce two spectrally broadened SC pulses in an SC fiber is seen in FIG. 2A. Pulses 20 and 22 are delayed by a time delay τ and then inserted into an SC fiber 24. The pulses 20 and 22 undergo spectral broadening within the SC fiber 24, and emerge as SC pulses 20' and 22' which are separated by time delay τ' (where τ and τ' are equal). Pulses 20' and 22' can then be used to generate multiple optical frequency channels as will be described below.

A graph illustrating the frequency domain of a multiple channel generation of the SC pulses shown in FIG. 2A, is shown in FIG. 2B. The theoretical background for the SC multiple frequency channels generation will be described below.

Two pump pulses (e.g., pulses 20 and 22) produce two independent SC pulses (e.g., pulses 20' and 22'). The amplitudes of the generated SC are E(t) and E(t−τ) and are separated in time by interval τ'. Additionally, G(ω) and G(ω)exp(−i ωτ) are the respective Fourier transformed spectral amplitudes of these pulses. At the spectral output, the pulses produce a spectral interference pattern with a spectral intensity distribution as defined by Equation 1 below.

$$I=|G(\omega)+G(\omega)\exp(-i\,\omega\tau)|^2=2|G(\omega)|^2(1+\cos(\omega\tau)) \quad \text{Equation (1)}$$

Moreover, in the spectral domain, the period of the spectral interference fringes is defined by Equation 2.

$$\Omega=1/\tau \quad \text{Equation (2)}$$

The frequency interval between generated multiple optical channels can be changed by varying the time delay τ. The number of the generated frequency channels can be expressed by N as shown in Equation 3.

$$N=\Delta\nu/\Omega \quad \text{Equation (3)}$$

where Δν is a spectral bandwidth of the SC source, and the number of the channels N is in the range of 100 to 2000. In alternative embodiments, N is in the range of 2000 to 7000.

Figure 3:
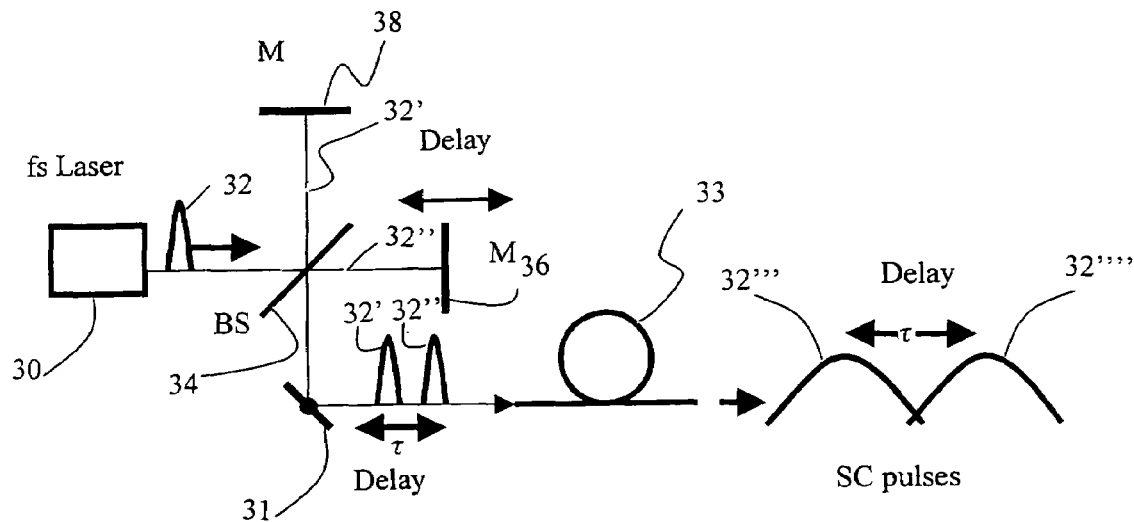
FIG. 3 is a block diagram of a laser source coupled to a Michelson Interferometer which can be used as a time-delay system, according to an embodiment of the present invention.

A block diagram of a laser source coupled to a Michelson Interferometer which can be used as a time delay system, according to an embodiment of the present invention, is seen in FIG. 3. The Michelson Interferometer acts as a pulse delay device. An fs laser 30 generates an fs pulse 32, which is incident upon a beam-splitter 34 and is subsequently split into two pulses 32' and 32" by beam-splitter 34. Pulse 32" is not reflected by mirror 34, and subsequently is incident upon mirror 36, whereupon it is reflected back to the beam-splitter 34 and is then reflected so that it is incident upon optional mirror 31. Pulse 32', after being redirected by beam-splitter 34, is incident upon mirror 38 and reflected back through the beam-splitter 34. By adjusting the distance that pulses 32' and 32" travel, the pulses can be delayed by desired time τ. Moreover, the pulses can also be delayed by optical mediums such as glass which will be described below. The pulses 32' and 32" are then incident upon optional mirror 31, then enter SC fiber 33, and are then spectrally broadened and converted into SC pulses 32''' and 32'''' separated by time delay τ'. It should be noted that pulses 32' and 32'' have been arbitrarily chosen and either can precede the other. Moreover, the pulses can be optically amplified by an optical amplifier (e.g., an erbium-doped fiber amplifier (EDFA) or any other suitable optical or IR repeater that amplifies a modulated laser beam directly, without opto-electronic and electro-optical conversion) which is not shown.

Figure 4:
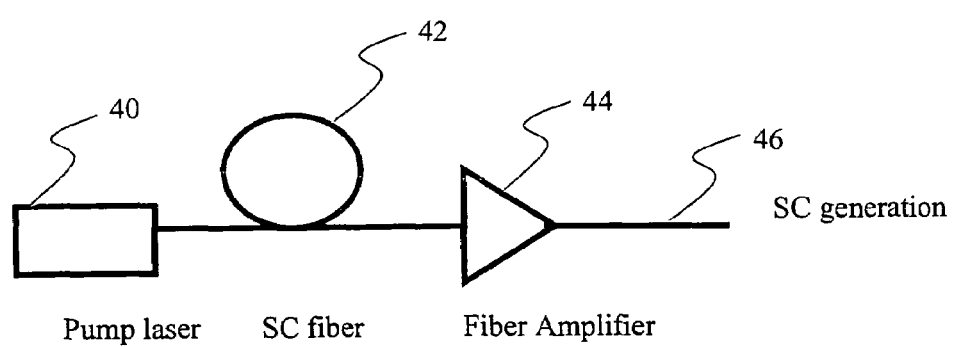
FIG. 4 is a block diagram illustrating a basic configuration of an SC source according to an embodiment of the present invention.

A block diagram illustrating a basic configuration of an SC source according to an embodiment of the present invention is shown in FIG. 4. The optical pump laser 40 is coupled to an SC fiber 42 so that one or more optical pulses (not shown) generated by the laser are converted to SC pulses (not shown). The generated SC pulses are then input to a fiber amplifier 44 which amplifies the one or more SC pulses (not shown) and outputs the resultant one or more SC pulses at end 46.

Figure 5A:
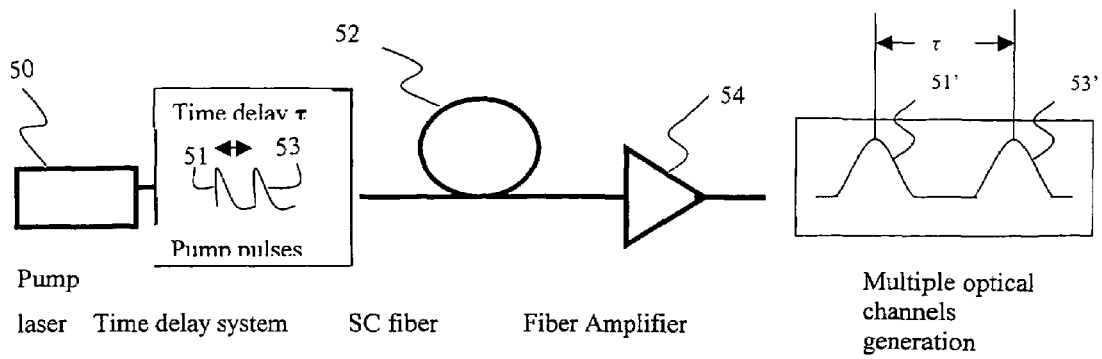
FIG. 5A is a block diagram illustrating a basic configuration of an SC source for producing multiple optical channels according to an embodiment of the present invention.

A block diagram illustrating a basic configuration of an SC source for producing multiple optical channels according to an embodiment of the present invention is shown in FIG. 5A. A laser pump 50 generates a plurality of pump pulses (e.g., 51 and 53) separated by a time delay τ'. The pump pulses are then fed to SC fiber 52, which converts the pump pulses into SC pulses (not shown). The SC pulses are then amplified by a fiber amplifier 54, and emerge as multiple optical channel pulses 51' and 53', having a time delay τ. At the spectral output, these two spectrally broadening SC pulses produce spectral interference patterns with the distance between frequency channels equal to a distance which is defined by $\Omega = 1/\tau$. It should also be noted that by causing multiple delays an optical pump pulse can be split into a plurality of pulses. For illustration only, only two pump pulses are shown.

Figure 5B:
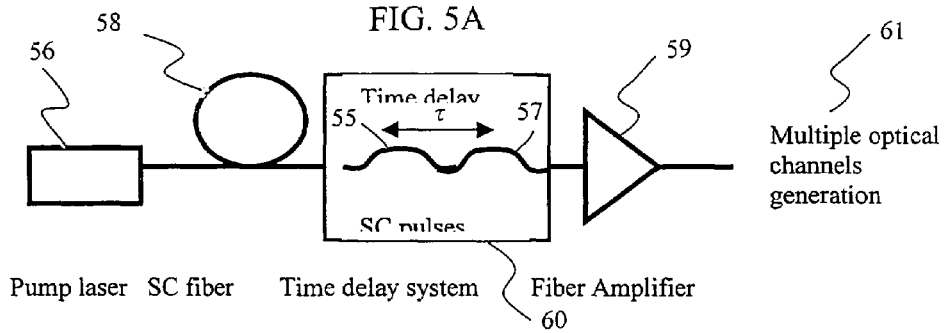
FIG. 5B is a block diagram illustrating a basic configuration of an alternative SC source for producing multiple optical channels according to an alternative embodiment of the present invention.

A block diagram illustrating a basic configuration of an alternative SC source for producing multiple optical channels according to an alternative embodiment of the present invention is shown in FIG. 5B. In this embodiment, a pump laser 56 is coupled to SC fiber 58, which is further coupled to a time delay system 60 which is coupled to an fiber amplifier 59. In use, the pump laser 56 generates a single pulse, which is incident upon the SC fiber 58 and converted into an SC pulse (not shown). This SC pulse is then input to the time delay system 60 which splits the single SC pulse into at least two SC pulses 55 and 57 having a time delay τ between each of them. For illustration, only two SC pulses are shown. SC pulses 55 and 57 are then amplified by the fiber amplifier 59. SC pulses 55 and 57 produce a spectral interference pattern with the distance between the channels equal to Ω.

Figure 6:
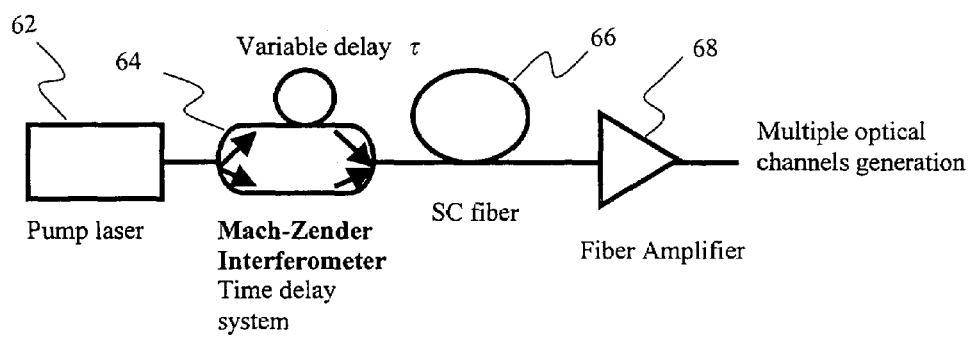
FIG. 6 is a block diagram illustrating the use of a time-delay system including a fiber-optic-based Mach-Zender Interferometer according to an embodiment of the present invention.

A block diagram illustrating the use of a time-delay system including a fiber-optic-based Mach-Zender Interferometer to produce a multiple optical channel generation according to an embodiment of the present invention is shown in FIG. 6. The fiber-optic-based Mach-Zender Interferometer (MZI) 62 is used as a time-delay system. The input pulse is split into the two pulses by the input beam splitter (not shown) of the MZI. A time delay between two pulses is produced by the different fiber lengths of the MZI. The time delay can vary, changing the length of the MZI fiber by a piezo-electric transducer (PZT) which is not shown. The two pulses are combined with a predetermined time delay by the MZI output combiner. The system includes a pump laser 62 which is coupled to the MZI 64, which is coupled to SC fiber 66, and subsequently coupled to amplifier 68. This system is similar to the embodiments as described above, and therefore an operational description is not provided.

Figure 7:
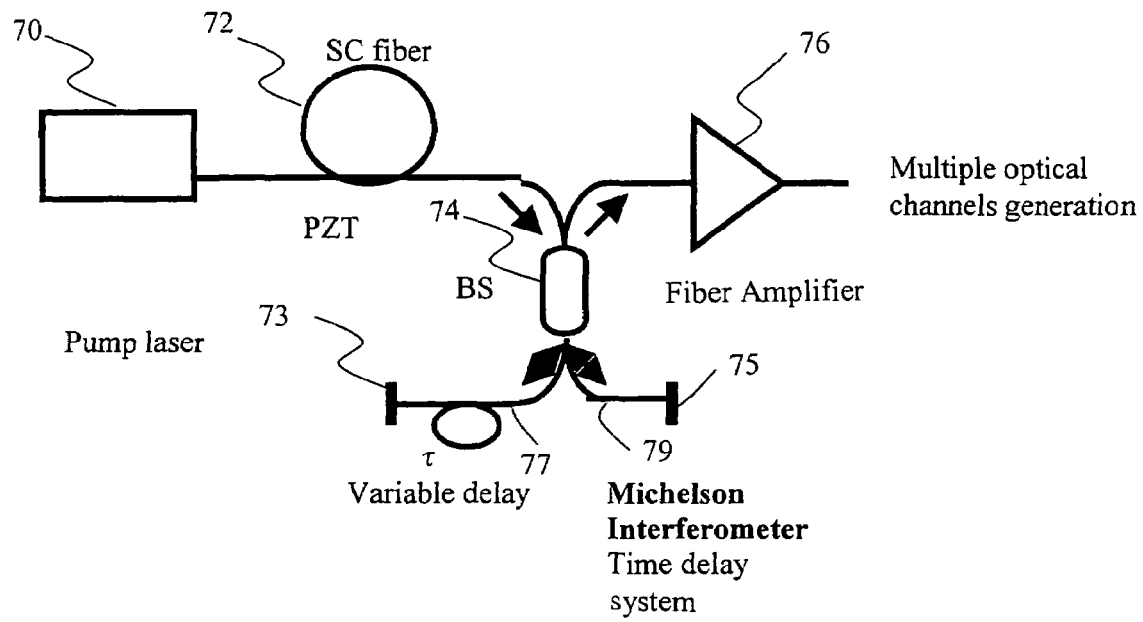
FIG. 7 is a block diagram illustrating a multiple optical channel generator including an optic-based Michelson Interferometer as a time-delay system, according to an embodiment of the present invention.

A block diagram illustrating a multiple optical channel generator including an optic-based Michelson Interferometer as a time delay system, according to an embodiment of the present invention, is shown in FIG. 7. In this embodiment, a Michelson Interferometer (MI) 74 is used as a time-delay system. In use, an optical pulse (not shown) generated by pump laser 70 is incident upon SC fiber 72 and is then split into at least two pulses by an input beam splitter of the MI 74. A time delay between two pulses is produced by different lengths of optical fibers 77 and 79 of the MI 74, respectively. The pulses are then reflected back by mirrors 73 and 75 placed at the ends of the optical fibers 77 and 79, respectively. The induced time delay can be varied by changing the length of the MI's 74 optical fibers (e.g., either or both of the optical fibers 77 and 79) by the PZT. The two pulses are combined with a predetermined time delay by the MI's 74 input beam splitter.

Figure 8:
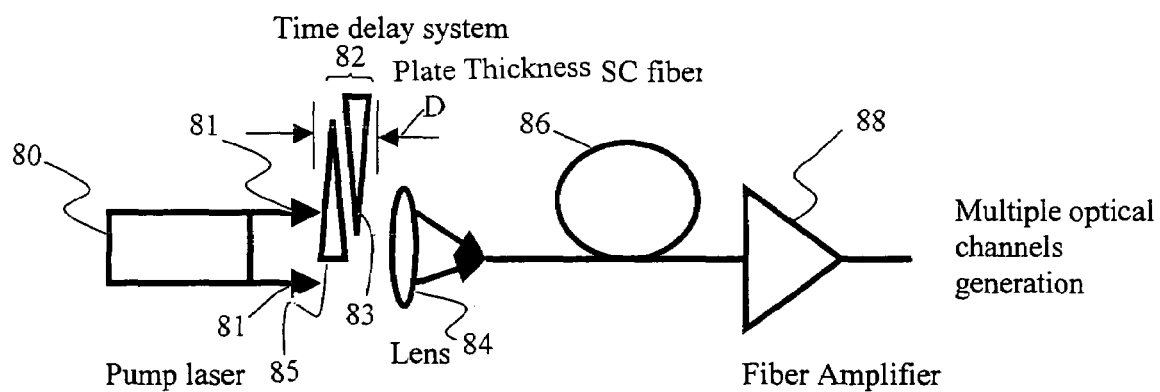
FIG. 8 is an illustration of a multiple optical channel generator including a variable thickness plate as a time-delay system, according to an embodiment of the present invention.

An illustration of a multiple optical channel generator including a variable thickness plate as a time-delay system, according to an embodiment of the present invention, is shown in FIG. 8. One or more of variable thickness plate 82 may be used as a time-delay system. The light transmission plate is placed into a portion of the pump laser's output beam 81 so that preferably substantially half of the pump laser's output beam is delayed by a time delay τ, where τ is defined by Equation 4.

$$T = (n-1)d/c \qquad \text{Equation (4)}$$

where n is the index of refraction of the plate 82, d is the thickness of the plate 82 and c is the speed of light. The plate includes two prisms 83 and 85, which can be adjustably located relative to each other to vary τ by changing the thickness d of the plate. A lens 84 is provided to focus the resulting pump laser's output beam 81 so that it can be incident upon the SC fiber 86.

Figure 9:
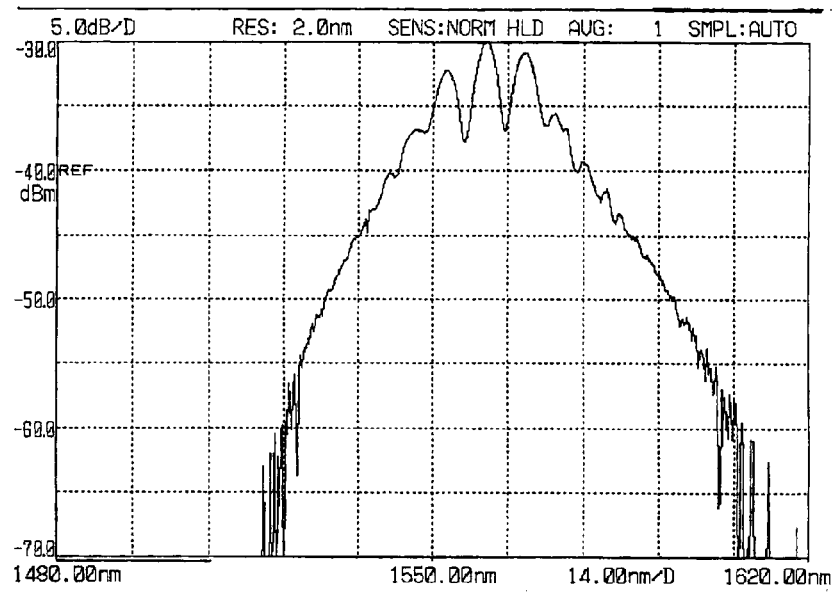
FIG. 9 is a graph which illustrates an SC spectrum produced in a 5-km telecom fiber by a single 90 fs pulse with a 50-MHz repetition rate.

A working embodiment of the present invention will now be described in detail. A fiber ring laser is used to produce optical pulses centered at 1560 nm with a pulse duration of 90 fs, with a 50-MHz repetition rate and an average power of 10 mW. A 5 km telecom fiber was used to produce the SC output, as is shown in the graph of FIG. 9.

Figure 10:
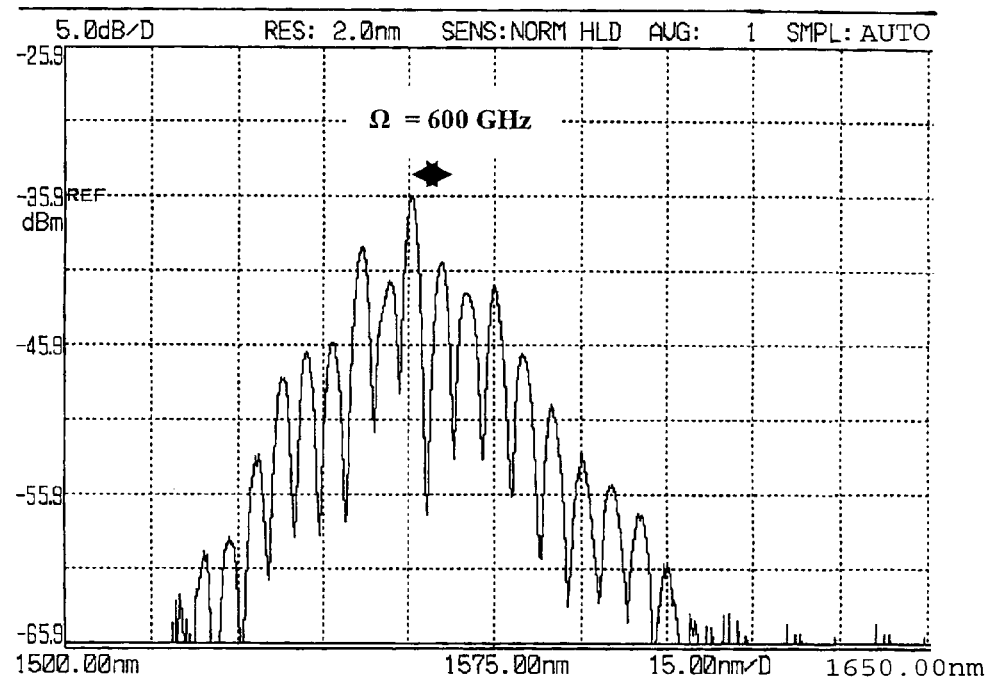
FIG. 10 is a graph which illustrates the generation of multiple optical channels, having a frequency distance between channels of 600 GHz, from an SC source using two pump pulses separated by a time delay τ=3.3 ps, according to an embodiment of the present invention.

A graph which illustrates the generation of multiple optical channels, having a frequency distance between channels of 600 GHz, from an SC source using two pump pulses separated by a time delay τ=3.3 ps, according to an embodiment of the present invention, is shown in FIG. 10. In this embodiment, the time delay system includes a 1-mm-thick glass plate which is placed so that one-half of the laser's output pump pulse beam diameter is incident upon the glass plate. The frequency distance between the channels is $\Omega = 1/\tau = c/(n-1)d = 3 \times 10^{11}/0.5 \times 1 = 600$ GHz, and the number of generated frequency channels, n, is 18.

Figure 11:
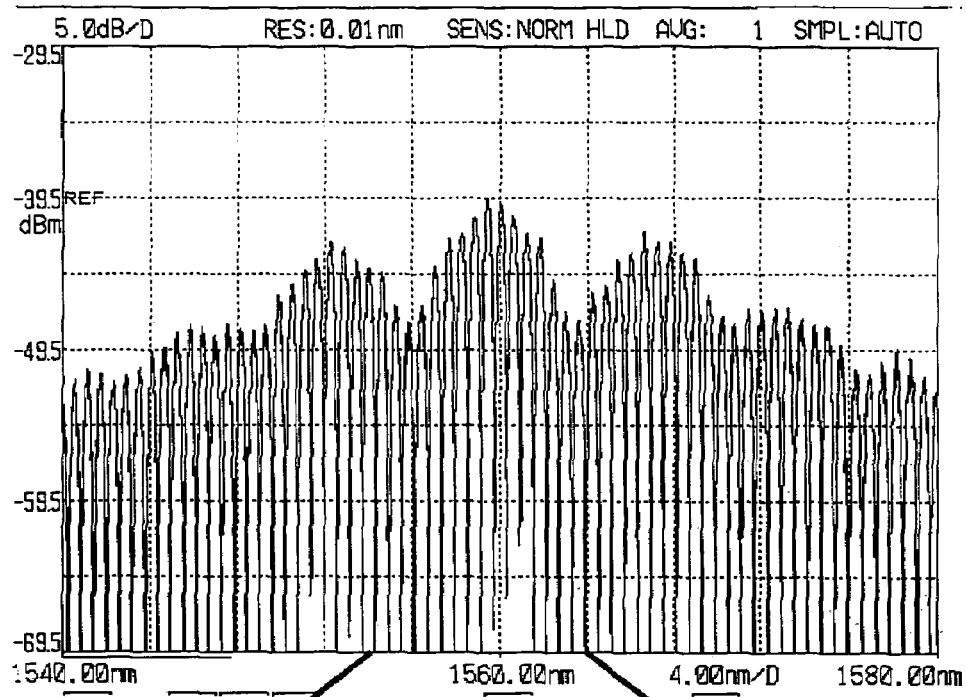
FIG. 11 is a graph which illustrates a multiple optical channel generation from an SC source where the frequency distance between channels is 75 GHz and the SC source uses two pump pulses separated by a time delay τ=26.4 ps, according to an embodiment of the present invention.

A graph which illustrates a multiple optical channel generation from an SC source where the frequency distance between channels is 75 GHz and the SC source uses two pump pulses separated by a time delay τ=26.4 ps, according to an embodiment of the present invention, is shown in FIG. 11. A fiber ring laser is used to produce optical pulses centered at 1560 nm with a pulse duration of 90 fs, with a 50-MHz repetition rate and an average power of 10 mW. A 5-km telecom fiber was used to produce the SC output, as shown in the graph of FIG. 9. In this embodiment, to decrease the distance between channels, an 8-mm-thick glass plate is placed in the output pulses so that one-half of the laser's output pump pulse beam diameter is incident upon the glass plate. The frequency distance between the channels is $\Omega=1/\tau=c/(n-1)d=600/8=75$ GHz, and the number of generated frequency channels, n, is 66.

Figure 12:
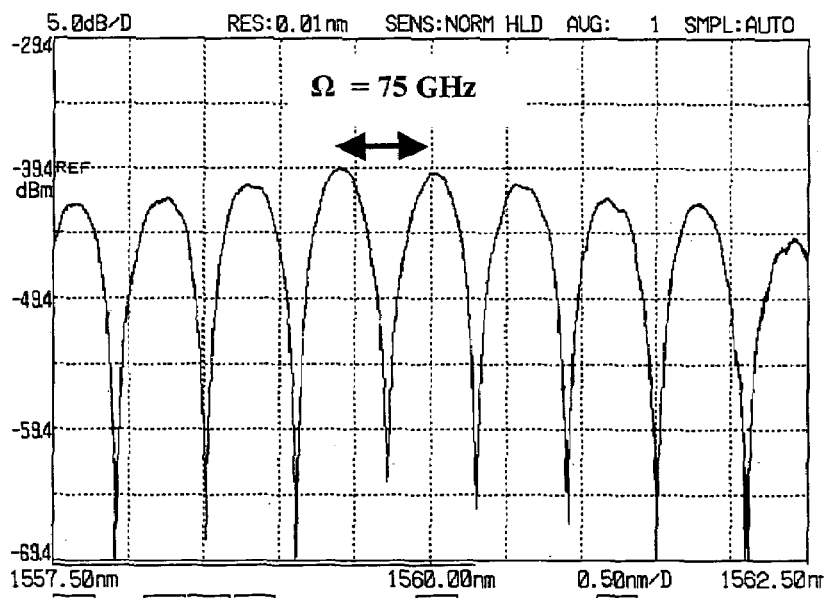
FIG. 12 is a graph which shows an expanded area of the graph shown in FIG. 11, wherein the channels are expanded.

A graph which illustrates a portion of the frequency channels shown in FIG. 11, is shown in FIG. 12. The frequency distance between the channels is $\Omega=1/\tau=c/(n-1)d=600/8=75$ GHz.

Figure 13:
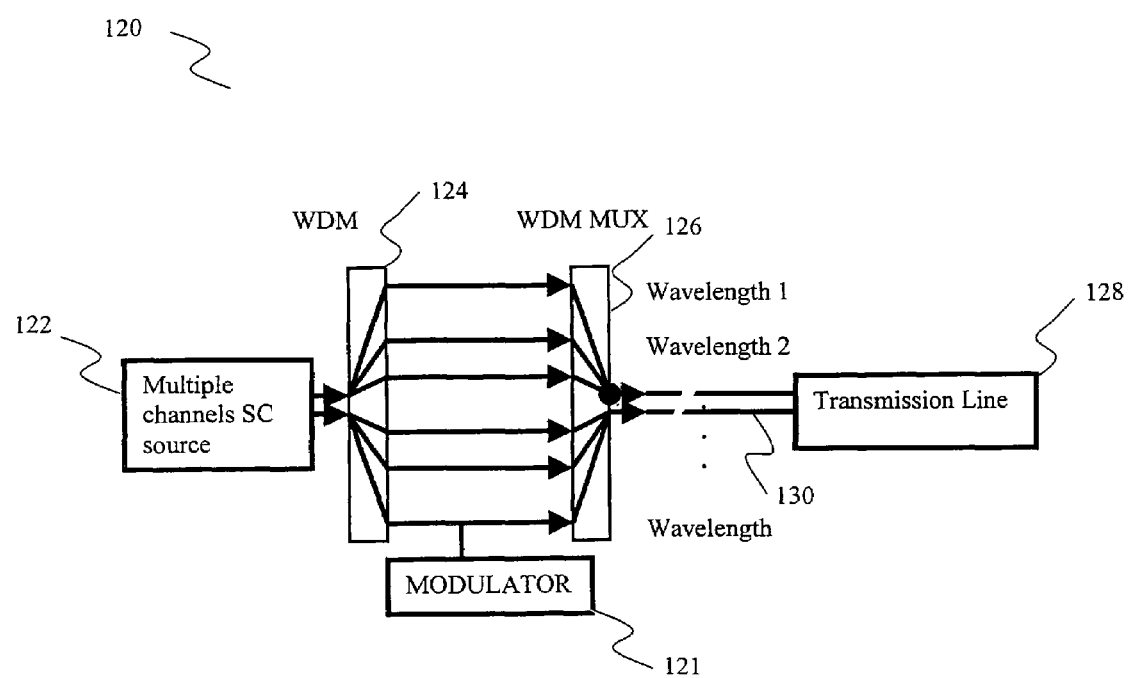
FIG. 13 is a block diagram which illustrates a setup of an optical WDM communication system according to an embodiment of the present invention.

A block diagram which illustrates a setup of an optical WDM communication system according to an embodiment of the present invention is shown in FIG. 13. The WDM communication system 120 includes an SC multiple optical channel source 122, which includes a control system (not shown), which is coupled to an input demultiplexer (DE-MUX) 124 for wavelength division demultiplexing through the use of Arrayed Waveguide Grating (AWG) device. The AWG separates frequency channels in space. In this case, each channel can be independently coded (by using different type modulators 121) and another AWG (multiplexer) 126 transfers all frequency channels into a single optical communication fiber 130 for transmission through transmission line 128.

The SC multiple channel source can generate multiple optical channels simultaneously, and thus provide for an efficient, simple, reliable and cost-effective WDM communication system. Moreover, as the SC multiple channel source can generate multiple optical frequency channels with uniform channel spacing, it is easy to control all the wavelengths on the International Telecommunication Union grids simultaneously. For these and other reasons, it is clearly seen that the current system is superior to existing WDM communication systems which use multiple lasers as an optical source.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for producing a multiple optical channel source from a supercontinuum (SC) generator, comprising the steps of:
   generating at least one optical pump pulse;
   splitting the at least one optical pump pulse into a plurality of optical pump pulses;
   applying a time delay to at least one of the plurality of optical pump pulses;
   generating a plurality of collinear SC pulses in a medium from the plurality of optical pump pulses; and
   causing spectral interference between at least two of the plurality of collinear SC pulses, wherein the spectral interference produces a plurality of optical frequency channels.

2. The method of claim 1, wherein a frequency distance between the plurality of optical frequency channels is adjusted by applying a variable optical delay between at least two of the optical pulses.

3. The method of claim 1, wherein a part of the optical pump pulse is passed through a glass plate thus splitting the optical pump pulse and delaying at least one optical pump pulse.

4. The method of claim 3, wherein the glass plate is a variable thickness glass plate.

5. The method of claim 4, wherein adjusting the thickness of the variable thickness glass plate also causes an adjustment of the variable optical delay and a subsequent adjustment of the frequency distance between the plurality of optical frequency channels.

6. The method of claim 1, wherein the plurality of optical frequency channels are spatially split, and information code is inserted into each of the optical frequency channels, whereupon the spacially split optical frequency channels with the information code inserted into each of the channels are combined and transmitted in free space or through optical communication fiber.

7. The method of claim 1, wherein the medium for generating the SC is selected from one of a fiber, waveguide or bulk material, having a high value of the $\chi^{(3)}$ nonlinear material characteristics.

8. An apparatus for producing multiple optical frequency channels from a supercontinuum (SC) generator, comprising:
   a laser for producing at least one optical pump pulse;
   an optical beam-splitter for splitting the at least one input pump pulse into at least two collinear pulses;
   a time delay system for applying a time delay between the at least two collinear pulses;
   a collinear combiner for collinearly combining the at least two collinear pulses having a time delay; and
   an SC producing medium having a high value of $\chi^{(3)}$ nonlinear response for generating a spectrally coherent SC pulse from each of the at least two collinear pulses and producing a plurality of optical frequency channels.

9. The apparatus as described in claim 8, wherein the SC producing medium is selected from one of a fiber waveguide or a bulk material.

10. The apparatus as described in claim 8, wherein the SC-producing medium comprises a variable-length fiber having a zero-dispersion wavelength, and the laser is a variable laser pump wherein the at least one optical pump pulse has a wavelength difference that is less than 100 nm.

11. The apparatus as described in claim 8, further comprising a Fabry-Perot type interferometer, having a variable path difference, coupled to the SC producing fiber.

12. The apparatus as described in claim 11, wherein the interferometer's input is coupled to an output of the SC-producing fiber, and an output of the interferometer is coupled to an imaging spectrograph.

13. The apparatus as described in claim 11, wherein the interferometer's input is coupled to an output of the SC-producing fiber, and an output of the interferometer is coupled to an optical spectrum analyzer.

14. The apparatus as described in claim 8, wherein the SC producing medium comprises an SC-producing fiber, and spectral interference between each of the at least two of the plurality of collinear SC pulses produces the plurality of optical frequency channels.

15. The apparatus as described in claim 8, wherein the optical splitter and the time delay systems comprise a variable thickness glass plate inserted into the path of the optical pump pulse such that a part of the optical pump pulse is passed through the glass plate thus splitting the optical pump pulse and delaying at least one optical pump pulse.

* * * * *